(12) United States Patent
Ahn (10) Patent No.: US 8,724,125 B2
(45) Date of Patent: May 13, 2014

(54) METHOD AND SYSTEM FOR PRINTING ACCORDING TO TRANSMISSION CONDITIONS

(75) Inventor: Sang-kil Ahn, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1385 days.

(21) Appl. No.: 11/705,789

(22) Filed: Feb. 14, 2007

(65) Prior Publication Data

US 2007/0242285 A1 Oct. 18, 2007

Related U.S. Application Data

(60) Provisional application No. 60/791,422, filed on Apr. 13, 2006.

(30) Foreign Application Priority Data

May 12, 2006 (KR) .................. 10-2006-0043137

(51) Int. Cl.
*G06F 3/12* (2006.01)
*G06K 15/02* (2006.01)
*G06K 15/00* (2006.01)

(52) U.S. Cl.
USPC ............ 358/1.13; 358/1.1; 358/1.2; 358/1.6; 358/1.15

(58) Field of Classification Search
USPC .................. 358/1.1, 1.2, 1.6, 1.13, 1.15
See application file for complete search history.

(56) References Cited

U.S. PATENT DOCUMENTS

| 6,273,535 | B1 | 8/2001 | Inoue et al. |
| 6,947,181 | B1 * | 9/2005 | Sato ........................ 358/400 |
| 2001/0023438 | A1 * | 9/2001 | Ishida ....................... 709/224 |
| 2002/0067500 | A1 | 6/2002 | Yokomizo et al. |
| 2002/0075392 | A1 * | 6/2002 | Imaeda ................. 348/333.05 |
| 2003/0050842 | A1 | 3/2003 | Wada et al. |

(Continued)

FOREIGN PATENT DOCUMENTS

| EP | 1324228 A1 | 7/2003 |
| JP | 2000-268055 | 9/2000 |

(Continued)

OTHER PUBLICATIONS

International Search Report issued on Jun. 25, 2007 but the International Searching Authority for PCT International Application No. PCT/KR2007/001477.

(Continued)

*Primary Examiner* — Doulas Q. Tran
*Assistant Examiner* — Justin Katzwhite
(74) *Attorney, Agent, or Firm* — Staas & Halsey LLP (57) ABSTRACT

A method and system for printing full images using a device are provided. The method includes determining print target information in response to a request from a device according to transmission conditions existing between the device and the image forming device. The method also includes transmitting the determined print target information to an image forming device. The method also includes printing selected contents from among data using the transmitted print target information.

20 Claims, 5 Drawing Sheets

(56) References Cited

U.S. PATENT DOCUMENTS

| | | | |
|---|---|---|---|
| 2003/0053145 A1* | 3/2003 | Nakane | 358/452 |
| 2003/0122940 A1 | 7/2003 | Myogo | |
| 2004/0021906 A1* | 2/2004 | Howard | 358/1.16 |
| 2004/0128349 A1* | 7/2004 | Maruyama | 709/203 |
| 2004/0223185 A1* | 11/2004 | Yamada et al. | 358/1.15 |
| 2005/0135421 A1* | 6/2005 | Chang et al. | 370/474 |
| 2006/0002751 A1 | 1/2006 | Matsutani | |
| 2006/0009259 A1 | 1/2006 | Tanaka | |
| 2006/0125927 A1 | 6/2006 | Watanabe | |
| 2006/0158152 A1* | 7/2006 | Taniguchi et al. | 320/106 |

FOREIGN PATENT DOCUMENTS

| | | |
|---|---|---|
| JP | 2001-16568 | 1/2001 |
| JP | 2001-45452 | 2/2001 |
| JP | 2002-135264 | 5/2002 |
| JP | 2003-198833 | 7/2003 |
| JP | 2003-345548 | 12/2003 |
| JP | 2004-274467 | 9/2004 |

OTHER PUBLICATIONS

Office Action issued in Korean Application No. 2006-43137 dated Sep. 5, 2007.
Chinese Office Action issued Jun. 30, 2011 in corresponding Chinese Patent Application 200780011417.6.
Japanese Office Action issued Aug. 2, 2011 in corresponding Japanese Patent Application 2009-505279.
European Search Report dated Dec. 29, 2011 issued in corresponding European Patent Application No. 07745655.6.
European Office Action dated Jan. 23, 2012 issued in corresponding European Patent Application No. 07745655.6.
Mobile Imaging and Printing Consortium, Inc. "Implementation Guidelines for Printing with Mobile Terminals," Version 2.0, Jan. 2006, pp. 1-98.
Chinese Office Action dated Apr. 23, 2012 issued in corresponding Chinese Patent Application No. 200780011417.6.
Japanese Office Action issued Aug. 21, 2012 in corresponding Japanese Patent Application No. 2009-505279.
Japanese Notice of Allowance mailed Feb. 12, 2013 for corresponding Japanese Application No. 2009-505279.

* cited by examiner

METHOD AND SYSTEM FOR PRINTING ACCORDING TO TRANSMISSION CONDITIONS

CROSS-REFERENCE TO RELATED PATENT APPLICATIONS

This application claims the benefit of U.S. Provisional Patent Application No. 60/791,422, filed Apr. 13, 2006, in the U.S. Patent and Trademark Office, and the benefit of Korean Patent Application No. 2006-43137, filed May 12, 2006 in the Korean Intellectual Property Office, the disclosures of which are incorporated herein in their entirety by reference.

BACKGROUND OF THE INVENTION

1. Field of the Invention

An aspect of the present invention relates to a method of printing contents by transmitting the contents to an image forming device from another device, and, more particularly, aspects of the present invention relate to a method of printing contents using a device, which appropriately transmits the contents to an image forming device by considering the size of the contents to be transmitted and a data transmission rate, as well as a system of printing contents using a device, which appropriately transmits the contents to an image forming device, by considering the size of the contents to be transmitted and a data transmission rate.

2. Description of the Related Art

When a user prints a plurality of images, the user may decide to transmit full images, thumbnail images, or contents lists to a printer. When the full images are transmitted, if images to be printed are selected from among the transmitted full images, the selected images are printed. However, when the thumbnail images or contents lists are transmitted, the user must select contents to be printed and request a device to transmit the selected contents. When the device transmits images of the selected contents to the printer, the printer prints the received images.

According to the related art, if full images of contents are transmitted to a printer regardless of a network environment, a transmission rate of the network environment decreases, or an excessively large memory space of the printer is required due to the large size of the data being transmitted. Further, if thumbnail images or contents lists are transmitted to the printer, due to a thumbnail image creating time and several data exchanges, even when the size of the contents is relatively small, a time delay occurs compared to the time required for the transmission of full images.

SUMMARY OF THE INVENTION

Aspects of the present invention provide a method and a system for printing contents using a device to transmit a file list, thumbnail images, or full images according to a data size of the contents or a transfer protocol state, before images stored in the device are transmitted to a printer.

According to an aspect of the present invention, there is provided a method of printing data using a device that is coupled to an image forming device. The method comprises determining print target information according to transmission conditions existing between the device and the image forming device in response to a request sent from the device to the image forming device, transmitting the determined print target information to the image forming device, and printing selected contents from among the data using the transmitted print target information.

According to another aspect of the present invention, there is provided a system of printing data using a device coupled to an image forming device via a network. The system comprises a host of the device to determine print target information according to transmission conditions existing between the device and the image forming device and to transmit the determined print target information to the image forming device, and a printing unit of the image forming device to print selected contents of the data using the transmitted print target information.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
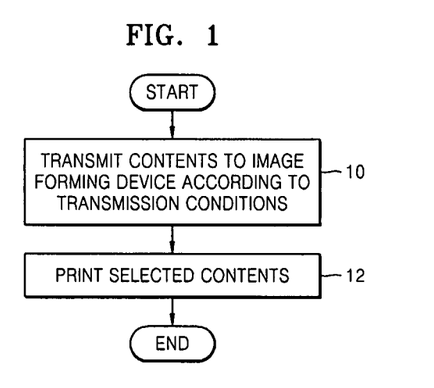
FIG. 1 is a flowchart illustrating a method of printing full images using a device according to an embodiment of the present invention.

FIG. 1 is a flowchart illustrating a method of printing full images using a device according to an embodiment of the present invention. As shown in FIG. 1, print target information is determined according to transmission conditions between the device and an image forming device in response to a request of the device, and the determined print target information is transmitted to the image forming device in operation 10. The transmission conditions include a transmission rate of a transfer protocol, a data size of selected contents, and the number of the selected contents. The transfer protocol may be one of wired protocols (i.e., a universal serial bus (USB) protocol), and of wireless protocols (i.e., a Bluetooth protocol and a wireless USB (WUSB) protocol. The transmission rate depends on the type of transfer protocol used. The data size of the selected contents indicates the size value obtained by summing a data size of each of the selected contents. The number of the selected contents indicates the number of the files of the selected contents. The print target information may be a list of contents, thumbnail images, and full images. Once the determined print target information is transmitted to the image forming device in operation 10, the selected contents are printed in operation 12 which will be discussed in greater detail below.

Figure 2:
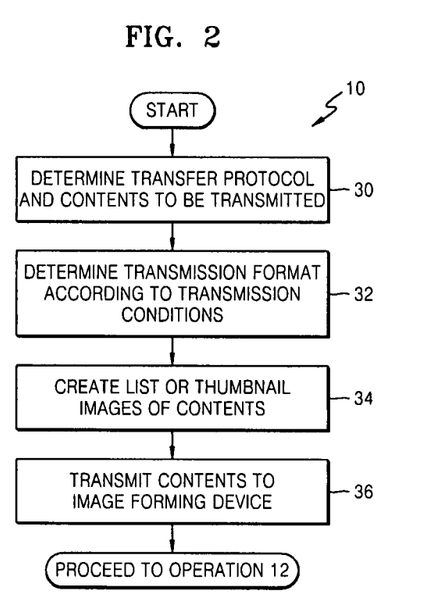
FIG. 2 is a flowchart illustrating a process of transmitting contents to an image forming device according to transmission conditions referred to in FIG. 1.

FIG. 2 is a flowchart illustrating operation 10 of FIG. 1, according to an embodiment of the present invention. As shown in FIG. 2, in operation 30, a transfer protocol between the device and the image forming device is determined. In addition, the particular contents to be transmitted to the image forming device are also determined. If various transfer protocols to transmit the contents exist, a transfer protocol having a relatively high characteristic transmission rate is determined to be the protocol to be used. In addition, the transfer protocol can be determined with consideration given as to whether the image forming device is able to print the contents by displaying whether the contents to be transmitted may be printed by the image forming device.

In operation 32, print target information is determined according to transmission conditions. Table 1 illustrates a lookup table used to determine print target information according to transmission conditions.

TABLE 1

| | | Data size of contents [in MB] | | |
|---|---|---|---|---|
| | | 0 to 1 | 1 to 3 | 3 or more |
| Transmission rate of transfer protocol [in minutes] | 0 to 1 | Full image | Full image | Thumbnail image |
| | 1 to 2 | Full image | Thumbnail image | List |
| | 2 or more | Thumbnail image | List | List |

For example, among the transmission conditions, when the data size of contents is less than 3 MB and the transmission rate of a transfer protocol is less than 1 minute, or when the data size of contents is less than 1 MB and the transmission rate of a transfer protocol is less than 2 minutes, the full image format to transmit full images of contents is determined as the print target information. When the data size of contents is less than 1 MB and the transmission rate of a transfer protocol is greater than 2 minutes, when the data size of contents is between 1 MB and 3 MB and the transmission rate of a transfer protocol is between 1 minute and 2 minutes, or when the data size of contents is greater than 3 MB and the transmission rate of a transfer protocol is less than 1 minute, the thumbnail image format to transmit thumbnail images is determined as the print target information. Lastly, when the data size of contents is greater than 3 MB and the transmission rate of a transfer protocol is greater than 1 minute, or when the data size of contents is greater than 1 MB and the transmission rate of a transfer protocol is greater than 2 minutes, the list format to transmit a list of contents is determined as the print target information.

Although Table 1 illustrates that print target information is determined using the data size of contents and a transmission rate of a transfer protocol, print target information may be determined using the number of contents files as the transmission conditions. That is, print target information may be determined using a lookup table that comprises a combination of the number of contents and transfer protocols or a combination of the number of contents and the data size of the contents.

In operation 34, a list of contents or thumbnail images is created. If the list format has been determined as the print target information in operation 32, a list of contents to be transmitted is created in operation 34. If the thumbnail image format has been determined as the print target information in operation 32, thumbnail images are created by reducing full images of contents to be transmitted into thumbnails of those images in operation 34.

In operation 36, according to the determined print target information, the contents determined for transmission are transmitted to the image forming device. For example, if the list format has been determined for use with the print target information, a list of the contents determined for transmission is transmitted to the image forming device, if the thumbnail image format has been determined for use with the print target information, thumbnail images of the contents determined for transmission are transmitted to the image forming device, and if the full image format has been determined for use with the print target information, full images of the contents determined for transmission are transmitted to the image forming device.

Referring back to FIG. 1, as noted above, in operation 12, contents selected from the transmitted contents are then printed.

Figure 3:
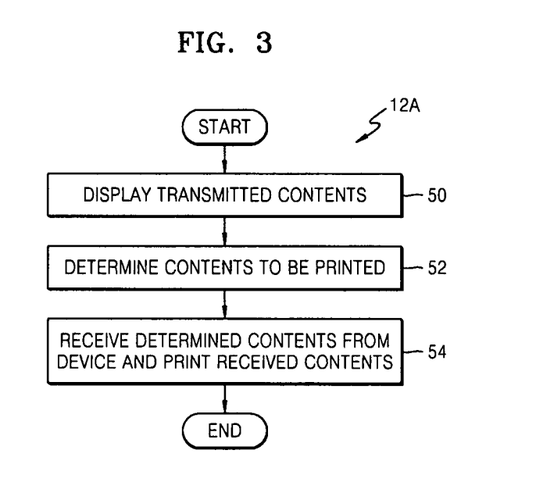
FIG. 3 is a flowchart illustrating a process of printing selected contents as shown in FIG. 1.

FIG. 3 is a flowchart illustrating operation 12 of FIG. 1, according to an embodiment of the present invention. As shown in FIG. 3, in operation 50, the contents transmitted from the device are displayed in correspondence with the determined print target information. That is, if the list format has been determined for use with the print target information, a list of the contents is displayed, and if the thumbnail image format has been determined for use with the print target information, thumbnail images of the contents are displayed, and if the full image format has been determined for use with the print target information, full images of the contents are displayed. When the contents are displayed, whether the transmitted contents are printable may be displayed.

In operation 52, contents to be printed are determined from the displayed contents. That is, the contents selected by a user from the contents displayed on the image forming device are determined to be contents to be printed. In operation 54, requests for the determined contents are made to the device, and, in response, the requested contents are received from the device and printed. If the displayed contents are either the list or the thumbnail images, a request for the contents determined for printing is made to the device. If the requested contents are received from the device in response, the received contents are printed using a printing engine. If the displayed contents are full images, the contents determined for printing are directly printed.

Figure 4:
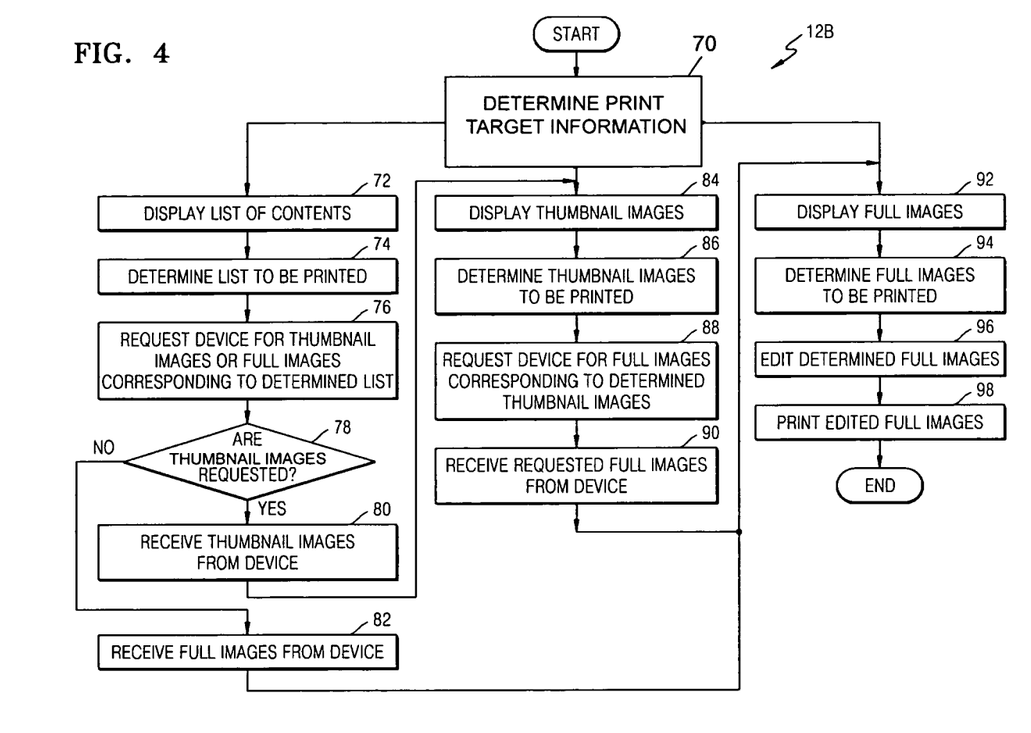
FIG. 4 is a flowchart illustrating a process of printing selected contents according to another embodiment of the present invention.

FIG. 4 is a flowchart illustrating operation 12 of FIG. 1, according to another embodiment of the present invention. As shown in FIG. 4, in operation 70, the image forming device senses the print target information of the transmitted contents. If the sensed print target information is formatted as a list, the image forming device displays a list of the contents transmitted in the list format in operation 72. In operation 74, a list to be printed is determined from the displayed list. That is, if the user selects a list of contents to be printed from the displayed list, the selected list is determined as the list of contents to be printed. In operation 76, the image forming device sends a request to the device for the thumbnail images or the full images corresponding to the determined list. In operation 78, the device determines whether the requested contents are thumbnail images or full images.

If thumbnail images have been requested from the device, the image forming device receives the requested thumbnail images from the device in operation 80. If full images have been requested from the device, the image forming device receives the requested full images from the device in operation 82.

If the sensed print target information is formatted as thumbnail images in operation 70, the image forming device displays thumbnail images of the contents transmitted in the thumbnail image format in operation 84. In addition, after operation 80, the image forming device displays the thumbnail images received from the device in operation 84.

In operation 86, thumbnail images to be printed are determined from the displayed thumbnail images. In operation 88, the image forming device sends a request to the device for full images corresponding to the determined thumbnail images. In operation 90, the image forming device receives the requested full images from the device in response.

If the sensed print target information is formatted as full images in operation 70, the image forming device displays full images of the contents transmitted in the full image format in operation 92. In addition, after operation 82, the image forming device displays the full images that were received from the device in operation 92.

In operation 94, full images to be printed are determined from the displayed full images. In operation 96, the full images to be printed are edited using an image editing application. In operation 98, the edited full images are printed.

Figure 5:
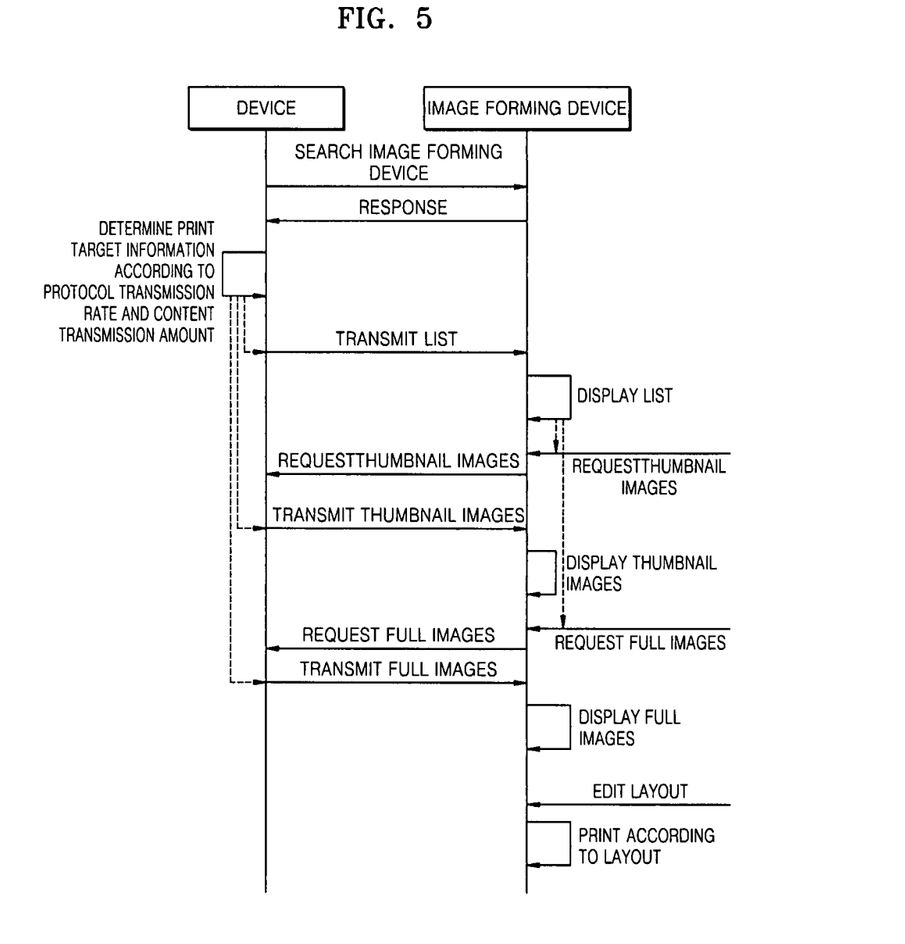
FIG. 5 is a signaling diagram illustrating a process of exchanging information between a device and an image forming device according to an embodiment of the present invention.

FIG. 5 is a signaling diagram illustrating a process of exchanging information between a device and an image forming device according to an embodiment of the present invention. When the device transmits a signal as part of a search for an image forming device, the image forming device, which is being searched for, responsively transmits a response signal to the device. The device then checks a transmission rate of a transfer protocol for data transmission with the image forming device and determines print target information of contents to be printed according to the checked transmission conditions. The device then transmits a list, thumbnail images, or full images to the image forming device according to the determined print target information. If a list is transmitted, the image forming device displays the transmitted list and requests the device for thumbnail images or full images corresponding to a determined list. If thumbnail images are requested, the device transmits the requested thumbnail images to the image forming device. The image forming device displays the transmitted thumbnail images and requests the device for full images corresponding to determined thumbnail images. The device transmits the requested full images to the image forming device. The image forming device displays the transmitted full images and edits a layout of the determined full images. The image forming device then prints the edited full images.

The embodiments of the present invention may be written as codes/instructions/programs and may be implemented in general-use digital computers that execute the codes/instructions/programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet). The computer readable recording medium may also be distributed over network coupled computer systems so that the computer readable code is stored and executed in a distributed fashion. Also, functional programs, codes, and code segments to accomplish the present invention may be easily construed by programmers skilled in the art to which the present invention pertains.

Figure 6:
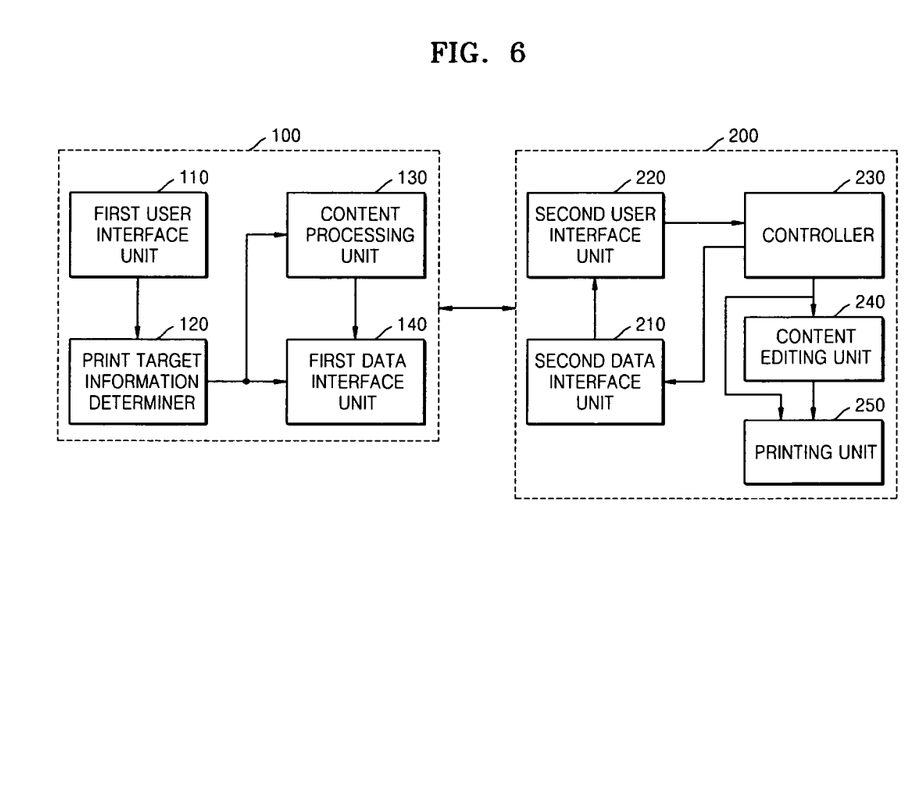
FIG. 6 is a block diagram of a system for printing full images using a device according to an embodiment of the present invention.

FIG. 6 is a block diagram of a system to print full images using a device according to an embodiment of the present invention. As shown in FIG. 6, the system includes a device 100 and an image forming device 200.

The device 100 determines print target information of contents according to transmission conditions and outputs at least one set of contents according to the determined print target information. To this end, the device 100 includes a first user interface unit 110, a print target information determiner 120, a content processing unit 130, and a first data interface unit 140. The first user interface unit 110 determines a transfer protocol between the device 100 and the image forming device 200, determines contents to be transmitted to the image forming device 200, and outputs the determined result to the print target information determiner 120.

When various transfer protocols used to transmit contents exist, the first user interface unit 110 makes a determination of a transfer protocol to be used based on which available transfer protocol has a relatively high transmission rate. In addition, the first user interface unit 110 makes a determination of a transfer protocol to be used based on consideration of whether the image forming device 200 is able to print contents when the transfer protocol is determined. To do this, the first user interface unit 110 displays whether the image forming device 200 is able to print the contents to be transmitted. When the contents to be transmitted to the image forming device 200 are determined, the first user interface unit 110 displays icons replacing contents which cannot be supported by the image forming device 200.

The print target information determiner 120 determines print target information according to transmission conditions that indicate a transmission rate of the determined transfer protocol, a data size of the determined contents, and the number of the determined contents, and outputs the determined print target information to the content processing unit 130 or the first data interface unit 140.

The print target information may be formatted as one of a list for transmitting a list of contents, as a thumbnail image for transmitting thumbnail images of contents, and as a full image for transmitting full images. As illustrated in Table 1, although print target information may be determined using the data size of contents and the transmission rate of a transfer protocol as the transmission conditions, print target information may also be determined using the number of contents files as the transmission conditions.

When the determined print target information is formatted as the list or the thumbnail images, if the contents to be transmitted do not have a list or thumbnail images corresponding to the determined print target information, the print target information determiner 120 outputs the determined print target information to the content processing unit 130. If the contents to be transmitted have a list or thumbnail images corresponding to the determined print target information, or if the determined print target information is the full image format, the print target information determiner 120 outputs the determined print target information to the first data interface unit 140.

The content processing unit 130 creates a list of the contents to be transmitted or thumbnail images by reducing full images of the contents to be transmitted according to the determined print target information and outputs the thumbnail images of the reduced full images of the contents to the first data interface unit 140.

The first data interface unit 140 transmits contents to the image forming device 200 according to the determined print target information. If the list format has been determined for use with the print target information, the first data interface unit 140 transmits a list of contents determined for transmission to the image forming device 200, if the thumbnail image format has been determined for use with the print target information, the first data interface unit 140 transmits thumbnail images of contents determined for transmission to the image forming device 200, and if the full image format has been determined for use with the print target information, the first data interface unit 140 transmits full images of contents determined for transmission to the image forming device 200.

The image forming device 200 prints contents determined among the contents transmitted from the device 100. To do this, the image forming device 200 includes a second data interface unit 210, a second user interface unit 220, a controller 230, a content editing unit 240, and a printing unit 250. The second data interface unit 210 exchanges data with the device 100. That is, the second data interface unit 210 receives the contents transmitted from the device 100 and transmits a content request signal, which is input from the controller 230, to the device 100.

The second user interface unit 220 displays the contents received from the second data interface unit 210 to correspond to the print target information determined by the device 100. That is, the second user interface unit 220 displays full images of the contents transmitted in the full image format, thumbnail images of the contents transmitted in the thumbnail image format, or a list of the contents transmitted in the list format. In addition, the second user interface unit 220 displays whether the transmitted contents can be printed. Icons replacing contents which cannot be printed are displayed.

The second user interface unit 220 determines contents to be printed among the displayed contents and outputs the determination result to the controller 230.

The controller 230 controls the second data interface unit 210 to send a request for the determined contents to the device 100 and to receive the requested contents from the device 100 in response.

The controller 230 controls the second data interface unit 210 to send a request for full images corresponding to the thumbnail images determined by the second user interface unit 220 to the device 100 and to receive the requested full images from the device 100. Alternately, the controller 230 controls the second data interface unit 210 to send a request for thumbnail images or full images corresponding to the list determined by the second user interface unit 220 to the device 100 and to receive the requested thumbnail images or full images from the device 100.

The controller 230 outputs the received full images to the content editing unit 240 or to the printing unit 250. The content editing unit 240 edits full images to be printed using an editing application and outputs the editing result to the printing unit 250. The printing unit 250 prints the contents received from the controller 230 or the content editing unit 240.

As is described above, in a method and system for printing full images using a device according to the present invention, by transmitting a file list, thumbnail images, or full images according to a data size of contents or a transfer protocol state, before images stored in the device are transmitted to a printer, a transmission rate may be higher and the amount of memory space used in the printer may be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pull printing method of printing contents using an image forming apparatus by requesting contents to be printed from a device, receiving the requested contents from the device, and printing the received contents, the method comprising:

requesting the contents from the device, wherein the image forming apparatus performs the requesting;

determining transmission conditions including at least two among a data size of the contents to be transmitted to the image forming apparatus, a transmission rate of a transfer protocol between the image forming apparatus and the device, and a number of contents to be transmitted to the image forming apparatus, wherein the device performs the determining;

selecting, by the device, a format from among a list format providing a list of the contents, a thumbnail image format and a full image format based on the determined transmission condition, wherein the format is selected based on a combination of at least two among the transmission rate, the data size and the number of contents;

generating and transmitting, by the device, the contents in the selected format to the image forming apparatus, wherein the device performs the generating; and if one or more contents are selected from among the contents in the selected format, printing full images corresponding to the selected contents, wherein the image forming apparatus performs the printing.

2. The method of claim 1, wherein the printing of the full images corresponding to the selected contents comprises:

if the image forming apparatus receives the list of the contents from the device, displaying the received list of the contents;

if the contents are selected from the received list of the contents, requesting the thumbnails or the full images corresponding to the selected contents from the device wherein the image forming apparatus performs the requesting;

transmitting the requested thumbnails or the full images to the image forming apparatus, wherein the device performs the transmitting; and displaying the thumbnails or the full images and printing the full images of the selected contents, wherein the image forming apparatus performs the displaying and the printing.

3. The method of claim 2, wherein the displaying and the printing of the selected contents comprises:

if the image forming apparatus receives the thumbnails of the contents, displaying the received thumbnails of the contents;

if the contents are selected from the thumbnails of the contents, requesting the full images of the selected contents from the device wherein the image forming apparatus performs the requesting;

transmitting the requested full images of the selected contents to the image forming apparatus, wherein the device performs the transmitting;

if the image forming apparatus receives the full images of the selected contents from the device, displaying the full images of the selected contents; and if the image forming apparatus selects at least one content from the full images of the selected contents, printing the full image of the selected at least one content.

4. The method of claim 2, wherein the displaying and the printing of the selected contents comprises:
if the image forming apparatus receives the full images of the selected contents, displaying the received full images of the selected contents; and
if the image forming apparatus selects at least one content from the displayed full images of the selected contents, printing the full image corresponding to the selected at least one content.

5. The method of claim 1, wherein the printing of the full images corresponding to the selected contents comprises:
if the image forming apparatus receives the thumbnails of the contents, displaying the received thumbnails of the contents;
if the contents are selected from the thumbnails of the contents, requesting the full images of the selected contents from the device, wherein the image forming apparatus performs the requesting;
transmitting the requested full images of the selected contents to the image forming apparatus, wherein the device performs the transmitting;
if the image forming apparatus receives the full images of the selected contents, displaying the received full images of the selected contents; and
if the image forming apparatus selects at least one content from the displayed full images of the selected contents, printing the full images of the selected at least one content.

6. The method of claim 1, wherein the printing of the full images corresponding to the selected contents comprises:
if the image forming apparatus receives the full images of the selected contents, displaying the received full images of the selected contents; and
if the image forming apparatus selects at least one content from the displayed full images of the selected contents, printing the full image corresponding to the selected at least one content.

7. The method of claim 1, wherein the transfer protocol is determined as a transfer protocol having a high transmission rate if a plurality of transfer protocols exists between the device and the image forming apparatus.

8. The method of claim 1, wherein the transmission conditions further comprise the number of the contents to be transmitted to the image forming apparatus.

9. The method of claim 1, wherein the printing of the full images corresponding to the selected contents comprises: editing the full images to be printed before the full images are printed.

10. A non-transitory computer readable recording medium storing a computer readable program for executing the method of claim 1.

11. A pull printing system comprising a device for transmitting contents and an image forming apparatus for requesting contents to be printed from the device, receiving the requested contents from the device, and printing the received contents,
wherein the device receives a request to transmit the contents from the image forming apparatus, determines transmission conditions including at least two among a data size of the contents to be transmitted to the image forming apparatus, a transmission rate of a transfer protocol between the image forming apparatus and the device, and a number of contents to be transmitted to the image forming apparatus, and selects a format from among a list format providing a list of the contents, a thumbnail image format and a full image format based on the determined transmission condition, wherein the format is selected based on a combination of at least two among the transmission rate, the data size, and the number of contents, and generates and transmits the contents in the selected format to the image forming apparatus,
wherein the image forming apparatus receives and displays the contents in the selected format, selects one or more contents to be printed, if there are no full image of the selected contents to be printed, requests the full images from the device, and if there are the full images of the selected contents to be printed, prints the full images.

12. The system of claim 11, wherein the device comprises:
a first user interface unit for receiving a request to transmit the contents from the image forming apparatus, and determining transmission conditions including a data size of the contents to be transmitted to the image forming apparatus and a transmission rate of a transfer protocol between the image forming apparatus and the device;
a print target information determiner for determining and generating any one of a list of the contents, thumbnails thereof, and full images thereof according to the transmission conditions; and
a first data interface unit for transmitting the generated one of the list of the contents, the thumbnails thereof, and the full images thereof to the image forming apparatus.

13. The system of claim 11, wherein the image forming apparatus comprises:
a second data interface unit for transmitting a signal requesting the contents to be printed to the device, and receiving the requested contents from the device;
a second user interface unit for displaying the received contents, and selecting the contents to be printed;
a controller for generating the signal requesting the contents to be printed from the device if no full images of the contents to be printed exists, and generating an instruction to print the contents if the full images of the contents to be printed exist; and
a printing unit for printing the full images of the contents according to control of the controller.

14. The system of claim 13, wherein the second user interface unit displays the list of the contents if the list of the contents is received, and selects the contents to be printed from among the displayed list of the contents, displays the thumbnails of the contents if the thumbnails of the contents are received, and selects the contents to be printed from among the displayed thumbnails of the contents, and displays the full images of the contents if the full images of the contents are received, and selects at least one full image to be printed from among the displayed full images of the contents; and
wherein the controller, if the contents to be printed are selected from among the list of the contents, requests the thumbnails or the full images corresponding to the selected contents from the device, if the contents to be printed are selected from among the thumbnails of the contents, requests the full images corresponding to the selected contents from the device, and if at least one full image to be printed is selected from among the full images of the contents, prints the selected full image.

15. The system of claim 11, wherein the transfer protocol is determined as a transfer protocol having a high transmission rate if a plurality of transfer protocols exists between the device and the image forming apparatus.

16. The system of claim 11, wherein the transmission conditions further comprise the number of the contents to be transmitted to the image forming apparatus.

17. The system of claim 11, wherein the image forming apparatus further comprises: a content editing unit for editing the full images to be printed before the full images are printed.

18. A device for printing full images comprising:
- a first user interface unit for receiving a request to transmit contents from an image forming apparatus, and determining transmission conditions including at least two among a data size of the contents to be transmitted to the image forming apparatus, a transmission rate of a transfer protocol between the image forming apparatus and the device, and a number of contents to be transmitted to the image forming apparatus;
- a print target information determiner for determining a format that among a list format providing a list of the contents, a thumbnail image format and a full image format based on the determined transmission condition, wherein the format is selected based on a combination of at least two among the transmission rate, the data size, and the number of contents and reconstructing the contents according to the determined format; and
- a data interface unit for transmitting the reconstructed contents in the determined format to the image forming apparatus.

19. An image forming apparatus for printing full images, the image forming apparatus comprising:
- a data interface unit for transmitting a signal requesting contents to be printed to a device, and for receiving contents in a predetermined format from the device, the predetermined format is selected by the device from among a list format providing a list of the contents, a thumbnail image format and a full image format based on transmission conditions, wherein the format is selected based on a combination of at least two among a transmission rate, a data size and a number of contents to be transmitted;
- a user interface unit for displaying the received contents in a predetermined format, and selecting one or more contents to be printed;
- a controller for generating the signal requesting the selected contents to be printed from the device if no full images of the selected contents to be printed exists, and generating an instruction to print the contents if the full images of the selected contents to be printed exist; and
- a printing unit for printing the full images of the selected contents under control of the controller.

20. The image forming apparatus of claim 19, wherein the second user interface unit displays the list of the contents if the list of the contents is received, and selects the contents to be printed from among the displayed list of the contents, displays the thumbnails of the contents if the thumbnails of the contents are received, and selects the contents to be printed from among the displayed thumbnails of the contents, and displays the full images of the contents if the full images of the contents are received, and selects at least one full image to be printed from among the displayed full images of the contents; and
- wherein the controller, if the contents to be printed are selected from among the list of the contents, requests the thumbnails or the full images corresponding to the selected contents from the device, if the contents to be printed are selected from among the thumbnails of the contents, requests the full images corresponding to the selected contents from the device, and if at least one full image to be printed is selected from among the full images of the contents, prints the selected full image.

* * * * *

UNITED STATES PATENT AND TRADEMARK OFFICE
CERTIFICATE OF CORRECTION

| | | |
|---|---|---|
| PATENT NO. | : 8,724,125 B2 | Page 1 of 1 |
| APPLICATION NO. | : 11/705789 | |
| DATED | : May 13, 2014 | |
| INVENTOR(S) | : Sang-kil Ahn | |

It is certified that error appears in the above-identified patent and that said Letters Patent is hereby corrected as shown below:

On the Title Page

Column 2, Item [56] (Primary Examiner), Line 1, Delete "Doulas" and insert -- Douglas --, therefor.

Signed and Sealed this
Twenty-eighth Day of October, 2014

Michelle K. Lee
*Deputy Director of the United States Patent and Trademark Office*